US008872880B1

(12) United States Patent
Matselyukh et al.

(10) Patent No.: US 8,872,880 B1
(45) Date of Patent: Oct. 28, 2014

(54) VIDEO CONFERENCE SERVICE WITH MULTIPLE SERVICE TIERS

(75) Inventors: Taras Matselyukh, Bergen (NL); Scott Stevens, Windham, NH (US); Vijay Kamisetty, Nashua, NH (US); Darpan Gogia, Nashua, NH (US); Naveen Udoshi, Fremont, CA (US); Gregory A. Sidebottom, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 385 days.

(21) Appl. No.: 13/341,342

(22) Filed: Dec. 30, 2011

(51) Int. Cl.
*H04N 7/14* (2006.01)

(52) U.S. Cl.
USPC .............. 348/14.08; 348/14.01; 348/14.02; 348/14.04; 348/14.09; 370/218; 370/254; 370/329; 370/392; 370/412; 455/404.1; 455/405; 705/2; 709/204; 709/206; 709/218; 709/227; 709/229

(58) Field of Classification Search
CPC ......... H04N 7/152; H04N 7/15; H04M 15/00; H04L 1/00
USPC .......... 348/14.02, 14.08, 14.09, 14.01, 14.04; 370/218, 260, 329, 352, 389, 392, 412; 379/90.01, 93.07, 201.01, 257, 265.11; 455/405, 404.1; 705/2; 709/204, 218, 709/227, 229, 206
See application file for complete search history.

(56) References Cited

U.S. PATENT DOCUMENTS

| | | | |
|---|---|---|---|
| 7,020,150 B2 * | 3/2006 | Ho et al. ....................... 370/412 |
| 7,023,979 B1 * | 4/2006 | Wu et al. .................. 379/265.11 |
| 7,028,088 B1 * | 4/2006 | Koperda et al. ............... 709/229 |
| 7,058,023 B2 * | 6/2006 | Wynn ............................ 370/254 |
| 7,164,435 B2 * | 1/2007 | Wang et al. ................ 348/14.08 |
| 7,321,383 B2 * | 1/2008 | Monagahn et al. ........ 348/14.02 |
| 7,536,437 B2 * | 5/2009 | Zmolek ......................... 709/206 |
| 7,577,420 B2 * | 8/2009 | Srinivasan et al. .......... 455/404.1 |
| 7,777,777 B2 * | 8/2010 | Bowman et al. ........... 348/14.08 |
| 7,969,461 B2 * | 6/2011 | Nimri et al. ................ 348/14.08 |
| 8,144,182 B2 * | 3/2012 | Shoemake et al. ......... 348/14.04 |
| 8,149,771 B2 * | 4/2012 | Khivesara et al. ............ 370/329 |
| 8,200,827 B1 * | 6/2012 | Hunyady et al. .............. 709/227 |
| 8,204,042 B2 * | 6/2012 | Anschutz et al. ............. 370/352 |
| 8,224,289 B2 * | 7/2012 | Poltorak ....................... 455/405 |
| 8,228,360 B2 * | 7/2012 | Hamilton ................... 348/14.01 |

(Continued)

OTHER PUBLICATIONS

Telepresence and High Definition Videoconferencing on Converged Networks, A New Architecture for Delivering Visual Collaboration Services, Wainhouse Research, Dec. 2010 (19 pages).

(Continued)

*Primary Examiner* — Gerald Gauthier
(74) *Attorney, Agent, or Firm* — Harrity & Harrity, LLP

(57) ABSTRACT

A system may include a device that receives requests to initiate a videoconference call. The requests may include an indication of a service priority tier that should be applied to the call and first and second client devices for the call. The system may determining bandwidth availability in a network and determine, based on the bandwidth availability and based on the indication of the service priority tier of the call, whether to admit the videoconference call to the network. The device may provision, when it is determined to admit the call to the network, traffic policies corresponding to one or more network devices, where the policies are determined based on the service priority tier of the videoconference call.

22 Claims, 7 Drawing Sheets

(56) References Cited

U.S. PATENT DOCUMENTS

| | | | |
|---|---|---|---|
| 8,270,584 B2* | 9/2012 | Smith | 379/201.01 |
| 8,432,430 B2* | 4/2013 | Jun et al. | 348/14.01 |
| 8,456,510 B2* | 6/2013 | King et al. | 348/14.09 |
| 8,589,176 B2* | 11/2013 | Graves et al. | 705/2 |
| 8,634,536 B2* | 1/2014 | Ku et al. | 379/257 |
| 2004/0228291 A1* | 11/2004 | Huslak et al. | 370/260 |
| 2005/0025074 A1* | 2/2005 | Hiim et al. | 370/260 |
| 2005/0251421 A1* | 11/2005 | Chang et al. | 705/2 |
| 2006/0098625 A1* | 5/2006 | King et al. | 370/352 |
| 2007/0147374 A1 | 6/2007 | Lee et al. | |
| 2007/0168466 A1* | 7/2007 | Tooley et al. | 709/218 |
| 2008/0062988 A1* | 3/2008 | Daigle | 370/392 |
| 2009/0003194 A1* | 1/2009 | Schelen et al. | 370/218 |
| 2010/0287238 A1* | 11/2010 | Setton et al. | 709/204 |
| 2011/0189997 A1 | 8/2011 | Tiwari et al. | |

OTHER PUBLICATIONS

Juniper Networks, Solution Brief, "Juniper-Polycom Telepresence and HD Video Conferencing Solution", http://www.juniper.net/us/en/local/pdf/solutionbriefs/3510358-en/pdf., Jan. 2010, 4 pages.

Wainhouse Research White Paper, "Telepresence and High Definition Videoconferencing on Converged IP Networks", http://broadconnect.ca/resource-centre/white-papers/video-conferencing/telepresence-converged-ip-networks-whitepaper.pdf, Dec. 2010, 19 pages.

Bernstein et al., "Understanding and Implementing High Definition Videoconferencing: Building a Better Telepresence Service Using Junos", Juniper Networks, http://www.juniper.net/us/en/training/jnbooks/7100137-en.pdf, Dec. 2010, 200 pages.

\* cited by examiner

VIDEO CONFERENCE SERVICE WITH MULTIPLE SERVICE TIERS

BACKGROUND

Videoconferencing services may enable two or more locations to simultaneously interact via two-way audio and video transmissions. In a typical videoconferencing session, two or more end-devices, that may each include a video display device and a video camera, may connect, such as through an Internet Protocol (IP) based communication session, either to one another or to a bridge device. Video from each end-device may be compressed, transmitted as an IP-stream over a network, and provided at the other end-device(s).

A videoconference, and particularly a high definition videoconference (HDVC), may be a relatively bandwidth intensive service. Accordingly, videoconferencing services may require high investment in network infrastructure by the service provider. Ideally, a network that supports videoconferencing may include a combination of features such as high capacity, low latency/delay in the network elements to allow for interactive conversations, and little or no packet loss or network errors.

A number of attempts to address the difficulties associated with providing HDVC services on a network have been tried. One solution may be to build a high-capacity (over provisioned) network to accommodate 100% of peak demand for the HDVC services at all times. This approach can be generally expensive and may lead to low utilization of network infrastructure during off-peak hours. Another solution may be to implement static Quality of Service (QoS) on the network. This approach can be inadequate as it may be difficult to deliver consistent service quality during busy periods and may generally result in an underutilized network during off-peak hours.

SUMMARY

According to one aspect, a device-implemented method may include receiving a request, from a video call control device, at the time of initiation of a videoconference call, the request including an indication of a service priority tier that should be applied to the call and identify first and second client devices for the call. The method may further include determination of bandwidth availability in a network and determining, based on the prior determination of bandwidth availability in the network and based on the indication of the service priority tier of the call, whether to admit the videoconference call to the network. The method may further include network service provisioning steps, when it is determined to admit the call to the network, traffic policies corresponding to one or more network devices of the network. The policies being determined at least based on the pre-configured required service priority tier of the videoconference call and the policies relating to traffic quality of service for the videoconference calls which are already active; and transmitting an indication, of whether the videoconference call was admitted or not admitted to the network, to the video call control device.

According to another aspect, a system may include one or more devices to: receive a request, from a video call control device, to initiate a videoconference call, the request including an indication of a service priority tier that should be applied to the call and first and second client devices for the call; determine bandwidth availability in a network; determine, based on the bandwidth availability in the network and based on the indication of the service priority tier of the call, that the videoconference call is to be admitted to the network; provision, when it is determined to admit the videoconference call to the network, traffic policies corresponding to one or more network devices in the network, the policies being determined based on the service priority tier of the videoconference call; and transmit an indication, of whether the videoconference call was admitted or not admitted to the network, to the video call control device.

According to another aspect, the a system may include a call control server and a policy manager. The call control server may receive a request, from a client device, to initiate a videoconference call, determine a service priority tier associated with the videoconference call request, and transmit an indication, including the associated service priority tier, of the videoconference call request. The policy manager may receive the indication of the videoconference call request from the call control server, determine bandwidth availability in the network, determine, based on the bandwidth availability in the network and based on the service priority tier of the videoconference call, that the videoconference call is to be admitted to the network, and provision, when it is determined to admit the videoconference call to the network, traffic handling policies of one or more devices in the network, where the traffic handling policies for the one or more network devices may be determined based on the service priority tier of the videoconference call, the traffic handling policies relating to quality of service for traffic in the videoconference call.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

A system and/or method, described herein, may provide videoconferencing services over a network that supports multiple videoconference service classes and in which the videoconferencing infrastructure may track the availability of network resources in real-time or in near real-time. The videoconferencing infrastructure may include a call control server (CCS) and a policy manager (PM). The CCS may generally perform video call set up and the PM may manage the network elements, such as routers in the network. The PM may perform intelligent admission decisions when the CCS requests admission of video calls onto the network.

Videoconference calls may be described herein as being implemented using packet streams in a network. The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The phrase videoconference call, as used herein, may be more succinctly referred to as a conference call, video call, or simply a call. A videoconference call may refer to an HDVC or a non-HDVC (e.g., a standard definition video call).

Figure 1:
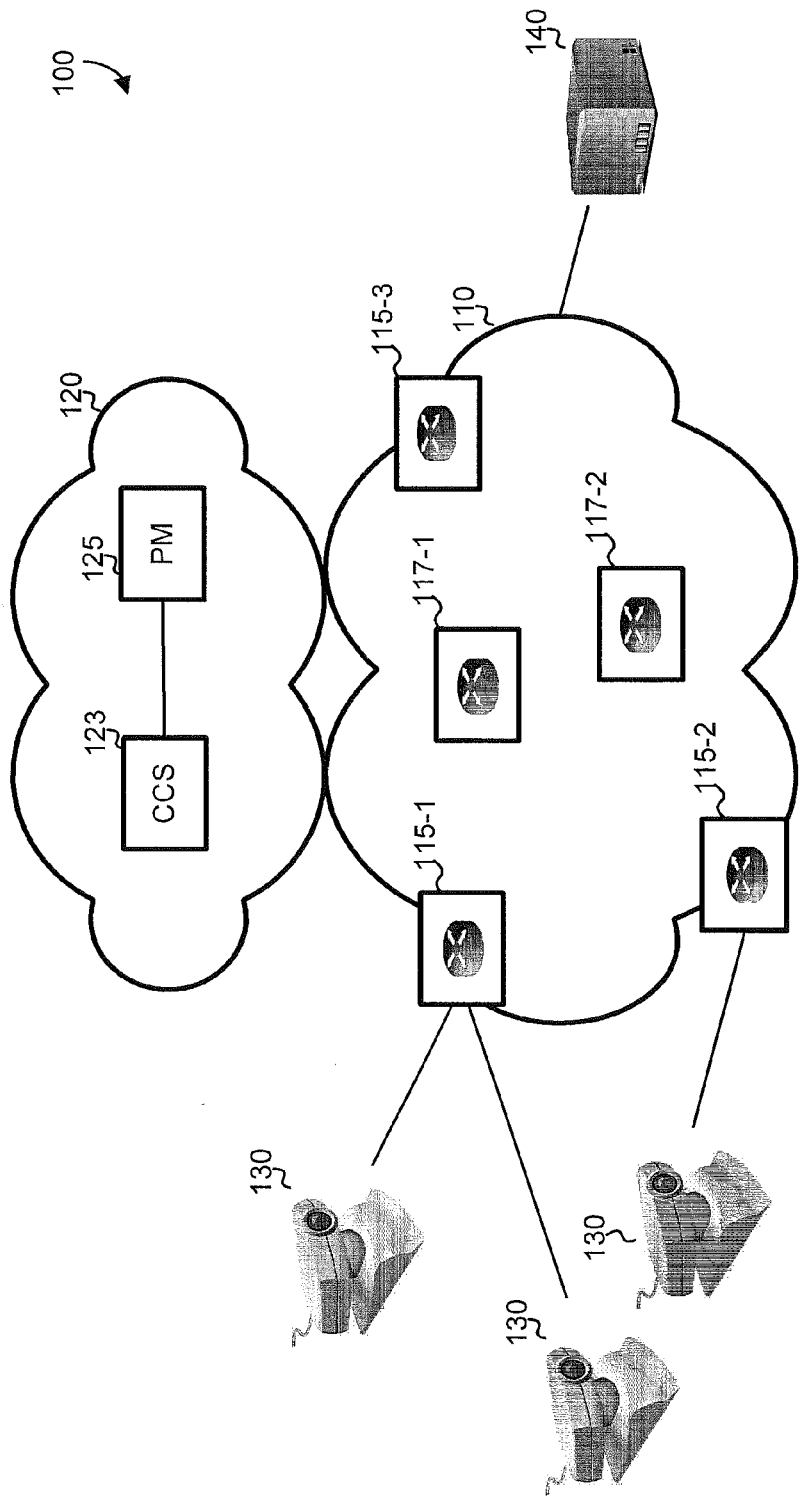
FIG. 1 is a diagram of an example system in which concepts described herein may be implemented.

FIG. 1 is a diagram of an example system 100 in which concepts described herein may be implemented. System 100 may include a core network 110 that provides network connectivity, for services such as videoconference services, to one or more subscribers, and a control network 120. Core network 110 may include the network over which the substantive data, for videoconference calls, is transferred. Control network 120 may include one or more network elements used to establish and control videoconference calls. Although shown as separate networks, in some implementations, networks 110 and 120 may be implemented as a single network. System 100 may further include one or more videoconference clients 130. Videoconference clients 130 may connect to one another to form videoconferences. In one implementation, a first client 130 may connect to a second client 130 to form a direct (through a core network 110) peer-to-peer videoconference connection. In an alternative implementation, multiple videoconference clients 130 may each connect to an intermediate device, such as a bridge 140. Bridge 140 may receive video streams from multiple clients 130 and may provide video streams back to clients 130. Through bridge 140, videoconferences with three or more clients 130 may be conducted.

Core network 110 may include, for example, a private or managed wide area network (WAN), a public network, or another type of network. Connections in core network 110 may be made through wireless and/or wired connections. In one implementation, core network 110 may be an IP-based packet-switched network. Core network 110 may be implemented using a number of network devices that include, for example, routers, switches, gateways, and/or other devices that may be used to implement core network 110. As illustrated, the network devices may include edge routers 115-1 through 115-3 (referred to herein collectively as "edge routers 115" or generically as "edge router 115") and core routers 117-1 and 117-2 (referred to herein collectively as "core routers 117" or generically as "core router 117").

Edge routers 115 may include subscriber edge routers or provider edge routers that provide routing and switching services for core network 110. In an alternative possible implementation, edge routers may perform other networking functions, such as acting as an aggregation switch. Videoconference clients 130, as well as other clients, may connect, either directly or indirectly, to edge routers 115 to obtain access to core network 110. Edge routers 115 may implement a number of protocols, such as a border gateway protocol, to access other networks or subscribers. In one implementation, edge routers 115 may support the Internet Engineering Task Force (IETF) RFC-4594, relating to guidelines for DiffServ Service Classes.

Core routers 117 may provide routing services within an autonomous system to carry traffic between edge routers 115. Core routers 117 may include high capacity back bone routers within core network 110.

Control network 120 may include one or more network elements and/or servers used to provide control and/or management functions for core network 110. Although shown as separate networks, in some implementations, core network 110 and control network 120 may be implemented as a single network. Control network 120 may particularly include CCS 123 and PM 125.

CCS 123 may include a device, such as a server device, that provides call set up, management, and tear down services for videoconference calls placed by clients 130. Signaling between CCS 123 and clients 130 may be performed using a signaling protocol, such as, for example, session initiation protocol (SIP) or H.323. H.323 is a recommendation from the ITU Telecommunication Standardization Sector (ITU-T) that defines protocols to provide audio-visual communication sessions on a packet network. CCS 123 may additionally include, or connect to, one or more data structures that include information relating to clients 130. For example, CCS 123 may be configured to include a videoconference service priority tier level for each of videoconference clients 130. In one implementation, and as discussed in more detail below, system 100 may support three service priority tier levels, where a call corresponding to a higher priority level may be given higher QoS parameters than a call corresponding to a lower priority level. The three service priority tier levels may be implemented using RFC-4594. In general, RFC-4594 provides only one QoS traffic class for multimedia conferencing. Multiple service tiers, as used herein, may be provided by using the one RFC-4594 QoS traffic for all of the service tiers (e.g., all three tiers) but differentiating between traffic in a single service class using differential service codepoints.

PM 125 may provide an interface to CCS 123, through which PM 125 and CCS 123 may communicate. CCS 123 may initiate a videoconference call through the interface. PM 125 may abstract the network details relating to a videoconference call from CCS 123. In response to a request to initiate a call, PM 125 may signal one or more network devices, such as edge routers 115, to provision the network services (such as guaranteed bandwidth or assured delay) for the call. For example, PM 125 may modify policies on one or more of edge routers 115 to accept a packet stream from a particular client 130 and to apply bandwidth limits or other traffic shaping and traffic conditioning policies to the packet stream.

Videoconference clients 130 may include devices to connect to network 110 and provide videoconference services to users. Each client 130 may include, for example, a video camera, a display device, an audio output device, and processing logic for encoding/decoding audio and video streams and transmitting/receiving the audio/video streams. Videoconference clients 130 may include specialized videoconference devices or general purpose computing devices, such as a personal computer, laptop, or a tablet computer.

Bridge 140 may include a server or another network device designed to host bridged videoconference calls. Bridge 140 may be particularly used by clients 130 when three or more clients 130 desire to hold a videoconference. Bridge 140 may generally function to receive audio/video streams from each of the videoconference clients that are participating in the call, and rebroadcast each received stream to all other videoconference clients that are participating in the call.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more other tasks described as being performed by one or more other components of system 100.

Figure 2:
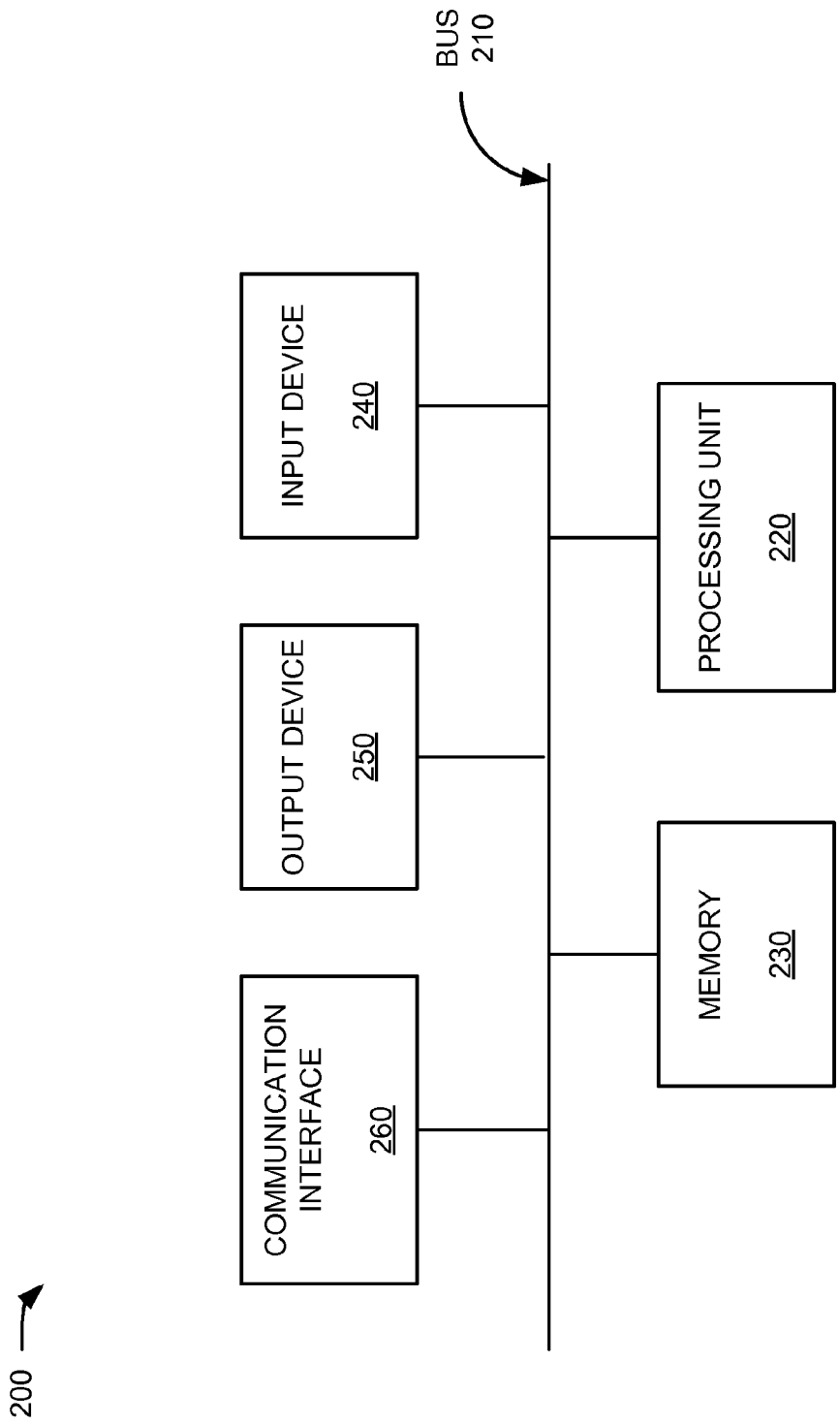
FIG. 2 is a block diagram of an example device of the system shown in FIG. 1.

FIG. 2 is a block diagram of an example device 200, which may correspond to a device in system 100, such as CCS 123, PM 125, client 130, and/or bridge 140. Each of CCS 123, PM 125, client 130, and/or bridge 140 may include one or more devices 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. Additionally or alternatively, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220; a read only memory (ROM), a flash memory, or another type of static storage device that stores static information and instructions for the processing unit 220; and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc. In an implementation in which device 200 corresponds to videoconference device 130, input device 240 may include a video camera and a microphone, and output device 250 may include a speaker and a display.

Communication interface 260 may include any transceiver-like mechanism that enables device 200 to communicate with other devices and/or systems. For example, communication interface 260 may include mechanisms for communicating with other devices.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
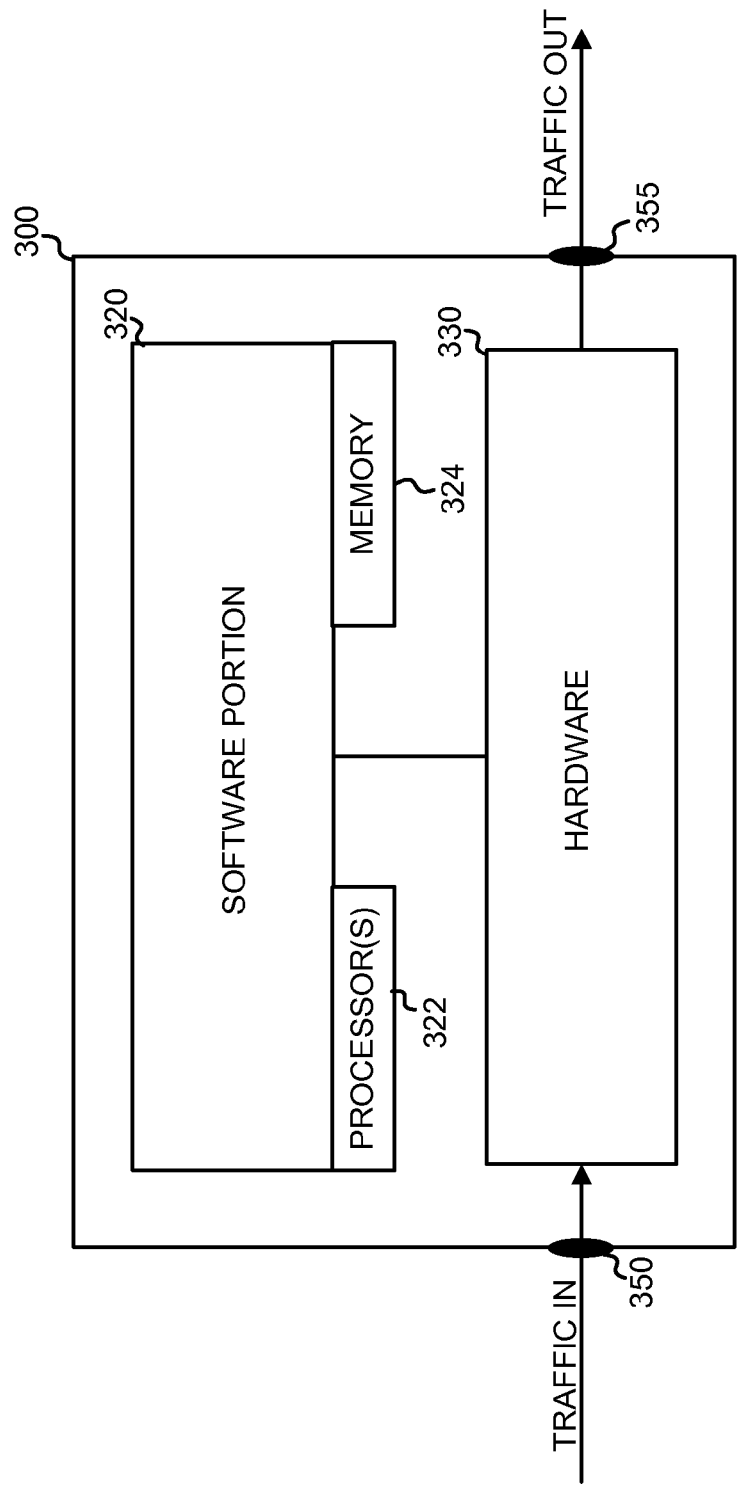
FIG. 3 is a block diagram of an example network device of the system shown in FIG. 1.

FIG. 3 is a block diagram of an example network device 300, which may correspond to one of edge routers 115 and/or core routers 117. In order to increase throughput, network device 300 may use dedicated hardware to assist in processing incoming packets. As shown in FIG. 3, network device 300 may generally include a software portion 320 and a hardware portion 330.

Software portion 320 may include software designed to control network device 300. In general, software portion 320 may implement the functions of network device 300 that are not time critical, such as the control plane functions of network device 300. The functions described as being performed by software portion 320, may be implemented through, for example, one or more processors 322 and one or more memories 324. Processor(s) 322 may include processors, microprocessors, or other types of processing logic that may interpret and execute instructions. Memories 324 (also referred to as computer-readable media herein) may include RAMs, ROMs, and/or other types of dynamic or static storage devices that may store information and instructions for execution by processors 322. In general, software portion 320 may perform certain functions in response to processor(s) 322 executing software instructions contained in a non-transitory computer-readable medium, such as memory 324.

Hardware portion 330 may include circuitry for efficiently processing packets received by network device 300. Hardware portion 330 may include, for example, logic, such as an ASIC, a FPGA, and/or a content-addressable memory (CAM). When network device 300 is a router and/or switch, hardware portion 330 may receive incoming traffic, extract header information for the traffic, and process the traffic based on the extracted header information.

Network device 300 may additionally include one or more input physical ports 350 for receiving incoming network traffic (e.g., packets) and one or more output physical ports 355 for transmitting outgoing traffic. In some implementations, a port may act as both an input port 350 and an output port 355.

Although network device 300 is shown as including a software portion 320 and a hardware portion 330, network device 300 may, in some implementations, be implemented entirely through hardware. Additionally, network device 300 may include additional, fewer, different, or differently arranged components than those illustrated in FIG. 3.

Figure 4:
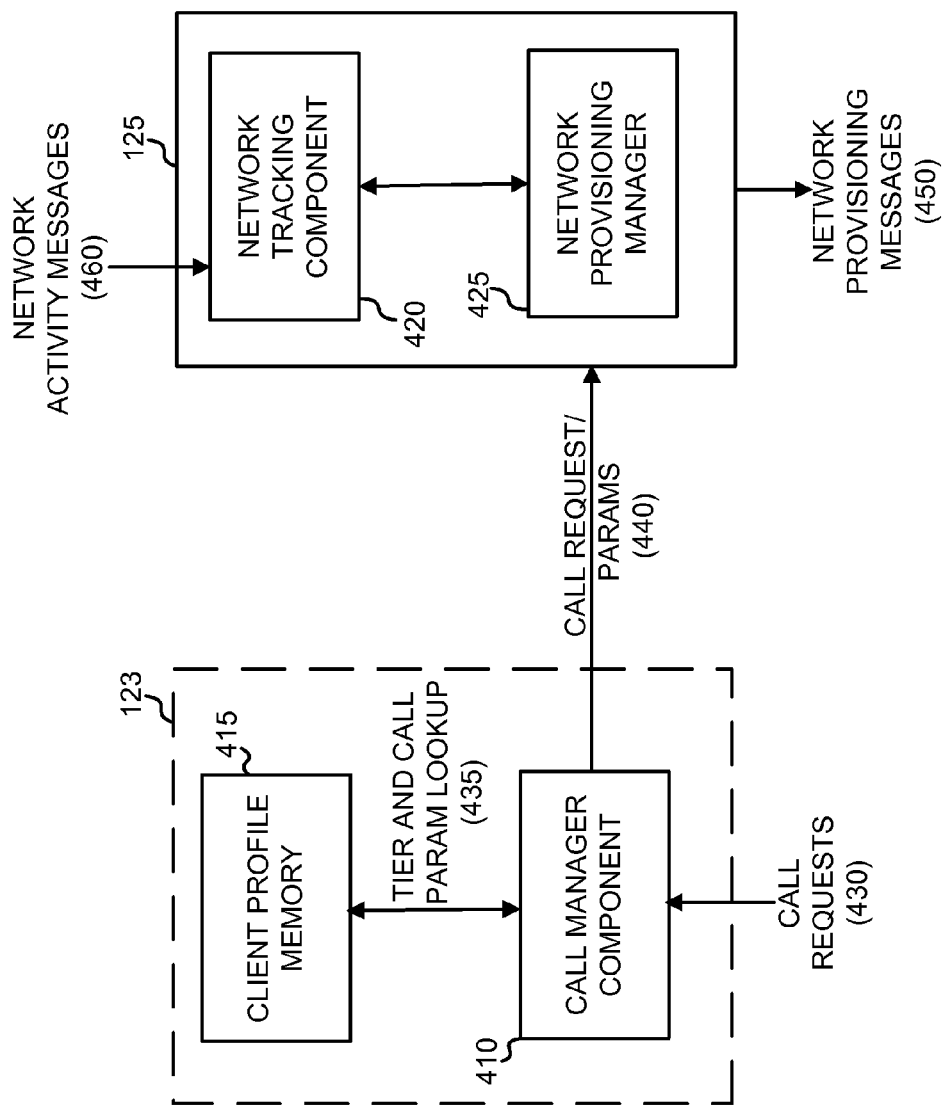
FIG. 4 is a diagram that conceptually illustrates components of the system of FIG. 1.

FIG. 4 is a diagram that conceptually illustrates components of CCS 123 and PM 125. As shown, CCS 123 may include a call manager component 410 and a client profile memory 415. PM 125 may include a network tracking component 420 and a network provisioning manager 425.

CCS 123 may act as the initial point of contact for videoconference clients 130. For instance, call manager component 410 may receive call requests 430 from videoconference clients 130. Each call request 430 may include information, such as an identifier associated with the destination client 130 or, in the case of a bridged videoconference, an address or identifier associated with bridge 140 and/or a virtual videoconference room. Signaling between CCS 123 and videoconference clients 130 may be performed using a signaling protocol, such as SIP, H.323, or another signaling protocol.

As previously mentioned, videoconference sessions in system 100 may each be assigned to one of a number of possible priority tiers. In one implementation, each client 130 (or alternatively, a user associated with a client 130) may be associated with a particular priority tier.

Client profile memory 415 may represent a file, database, or other structure that stores information relating to clients. For example, the associations between clients 130 and the priority tiers may be stored by client profile memory 415. Other information, such as preferences or other parameters relating to a particular client 130 (or user associated with the client 130) may additionally be stored in client profile memory 415.

Call manager component 410 may lookup, from client profile memory 415, the video conferencing tier associated with a client or with a videoconference (shown as tier and call parameter lookup 435). Because a call will include more than one client 130, one or more rules may be used to determine the service tier for a videoconference call based on the service tiers of clients 130 involved in the call. For example, for a point-to-point call between two clients 130, the priority tier of the call may be assigned as the highest priority tier of the two clients 130. As another example, the priority tier of the call may be assigned based on the callee (or alternatively, based on the caller). For conference calls in which multiple clients 130, such as three or more clients 130, may participate in a videoconference session, the priority tier may be set at a priority tier that is associated with the conference call. For example, a user may set up a conference call (virtual conference meeting room) beforehand by registering a conference call with CCS 123. The priority tier of the call may be assigned at this time, such as by a service tier associated with the user that sets up the call or set to the desired set or pre-set value by the user.

In addition to the priority tier associated with a call, call manager component 410 may lookup or otherwise obtain other parameters relating to a call. For example, a call may be associated with a timeout value that may be used to end a particular call after a certain timeout period of inactivity. As other examples of call parameters that may be obtained by call manager component 410, such as from client profile memory 415, a call may be associated with particular ports, network protocols, or bandwidth requirements.

The number of the priority tiers is not limited to the three tiers given in the examples discussed, herein, and may be defined based on real-life or business requirements of the users of the system. As an example of possible priority tiers, one implementation may include a three-tiered system: a highest priority tier, a middle priority tier, and a lowest priority tier. High priority traffic may always be handled by core network 110 (i.e., high priority calls will always be admitted). Core network 110 may be designed so that there is always sufficient bandwidth available to support high priority traffic. Bandwidth may be reserved, in core network 110, to support high priority calls and high priority calls may receive priority over other calls. As a general rule, the total portion of clients 130 (or users of clients 130) that are associated with high priority traffic may be limited to a certain threshold, such as not to exceed 10-20% of network capacity. High priority calls may be used for ad-hoc and scheduled calls, should not have limitations with regard to the time of admission to the network, and may have stringent QoS requirements, relative to the lower priority tier traffic, for network delay, jitter, and/or packet loss.

Middle priority traffic may be admitted onto core network 110 only when there is sufficient bandwidth to ensure a high-quality call. Middle priority traffic may generally be used for scheduled and ad-hoc calls with medium requirements for time of admission to the network, but may have relatively stringent QoS requirements, relative to low priority traffic, for network delay, jitter, and/or packet loss. As a general rule, the total portion of active clients 130 (or users of clients 130) that are associated with medium priority traffic may be limited to a certain threshold, such as not to exceed 60-80% of network capacity. The total number of active and inactive clients 130 who may initiate medium priority traffic may exceed the total available network bandwidth.

Low priority traffic may normally be admitted into core network 110, but the quality of these calls may not be guaranteed. At times of high system and network utilization, however, the low priority traffic may be not admitted. As a general rule, the total portion of active clients 130 (or users of clients 130) that are associated with medium priority traffic may be limited to a certain threshold. The low priority traffic tier may tend to be used mostly for ad-hoc calls with low requirements for service quality.

To summarize the above-described example traffic tiers, all calls for the high and middle priority tiers may be delivered with assured quality of service. High priority calls may always be admitted to core network 110, but for middle priority calls, core network 110 may not always have enough reserved capacity (e.g., during peak hours). Low priority calls may normally be admitted to core network 110 but may receive best-effort treatment at all-times.

In order to guarantee service levels for the traffic priority classes in the standard QoS model, a dedicated QoS class may be used for videoconference traffic. In one implementation, DiffServ Differentiated Services Code Point (DSCP) codepoints may be used to encode the priority tiers. For example, for three priority traffic tiers, the predefined codepoints, from the RFC-4594 specification, AF41, AF42, and AF43, may be used.

Referring back to FIG. 4, call manager component 410 may signal PM 125 to setup a videoconference call on core network 110 (call request and parameters 440). For a point-to-point (two clients 130) call, call manager component 410 may transmit a single call request to PM 125. For a conference call using bridge 140, however, call manager component 410 may transmit a call request, to PM 125, for each leg of the call. The parameters transmitted to PM 125, in the call request, may include parameters such as: the priority tier of the call, timeout values, parameters that characterize the packet flows that carry the calls (e.g., source and destination addresses, logical port numbers, etc.), bandwidth requirements, or other parameters. In general, the interface between CCS 123 and PM 125 may be designed to abstract the details of core network 110 from CCS 123. Additionally, PM 125 may handle the details relating to provisioning of core network 110 for a call. As an example of this, the endpoints for a videoconference call may be identified by CCS 123, to PM 125, using information that may tend to be available to CCS 123, such as network addresses.

An example of information (and examples of values) that may be transmitted from CCS 123 to PM 125 as part of a call request, in addition to the priority tier, may include the following:

timeout: 1800 (seconds)
    srcAddr: 192.168.41.128
    dstAddr: 10.31.31.10
    srcFlow: 192.168.41/128
    dstFlow: 10.31.31.0/24
    upStreamBandwidth: 2,400,000 (bps)
    downStreamBandwidth: 2,400,000 (bps)

Here, the timeout parameter may specify a time value, that if not updated by CCS 123 by the expiration of the time value, may indicate that PM 125 should terminate the call. The srcAddr and dstAddr parameters may indicate the IP addresses of the source and destination clients. The srcFlow and dstFlow parameters may identify the traffic streams, such as an identification based on port numbers, that will be utilized by the source and destination clients. The upStreamBandwidth and downStreamBandwidth parameters may indicate the bandwidth required by the upstream and downstream traffic flows. In some implementations, CCS 123 may later issue a modification request for an ongoing call, where the modification request may modify one or more of the parameters indicated in the initial call request, such as a modification of the requested bandwidth for any or all legs of the call, or substitution of the IP address if the need arises.

In one implementation, messages sent from CCS 123 to PM 125 may be made from the perspective of the caller for the call; that is, the meaning of source, upstream, destination, and downstream may be from the perspective of the caller. PM 125 may automatically translate, when generating policies for devices in core network 110, that apply to a callee or to bridge 140.

Referring back to FIG. 4, network tracking component 420, of PM 125, may include a database, file, or other data structure that PM 125 may use to keep track of network information, such as the state of network infrastructure in core network 110. For example, network tracking component 420 may store session information that associates each videoconference client 130 with a point in core network 110 (e.g., a router, interface, IP address). Network tracking component 420 may also track bandwidth usage or availability for congestion points along paths that calls may follow for each configured traffic tier. Network tracking component 420 may additionally track other information relating to the operation of core network 110. The tracked information may be used when determining to admit calls to core network 110, to determine where in network 100 to install policies relating to a call, and to detect inactivity timeouts.

The information maintained by network tracking component 420 may be received as messages, labeled as network activity messages 460, from network 110. The messages may be automatically transmitted by network elements or may be transmitted in response to queries submitted from network tracking component 420. There may be several classes of network activity messages: 1) device connect to or disconnects from the network (when a client 130 or bridge 140 connects/disconnects to/from edge router 115), 2) congestion point bandwidth change (when the bandwidth available on a network link changes, due to modern train rates or load balance core link failures for example), 3) flow usage (packet and byte counters for packets that match a policy installed for a particular call, used for billing purposes and/or to determine inactivity timeouts).

Based on call request/parameters 440, PM 125, such as through network provisioning manager 425, may control devices in core network 110, such as edge routers 115, to provision core network 110 for the videoconference call (network provisioning messages 450). The provisioning may include, for example, communicating with each of edge routers 115 that provide connectivity to clients 130 that are part of the call. In particular, network provisioning manager 425 may issue network provisioning messages 450 to network devices, such as edge routers 115 or to other network devices, as part of setting up of a call. The network provisioning messages may set policies associated with traffic flows for the call, such as policies relating to bandwidth limits, QoS policies, billing policies, performance monitoring policies, inactivity timeout policies, or other policies.

Calls may be terminated in a number of ways. For example, a "normal" call termination may include a client 130 "hanging up" and explicitly signaling CCS 123 to tear down the call, which may in turn signal PM 125 to remove any installed network policies for the call to free up resources in the network. Non-normal call terminations may be performed to provide PM 125 with a mechanism for freeing network resources even if another form of failure prevents CCS 123 from explicitly notifying PM 125 that a call has ended. One case of a non-normal termination may be based on a session timeout in which CCS 123 periodically signals PM 125 to extend the allotted call time. If CCS 123 fails to extend and the allotted time expires, PM 125 may automatically free the network resources. A second case of a non-normal termination may be based on an inactivity timeout based on network activity. For example, PM 125 may receive traffic flow information, such as packet and/or byte count information, from network elements. If the packet and/or byte count information fails to change in a certain interval, PM 125 may automatically free the network resources. Alternatively, an edge router 115 or another network element, other than PM 125, may perform the inactivity/session timeout operations.

Figure 5:
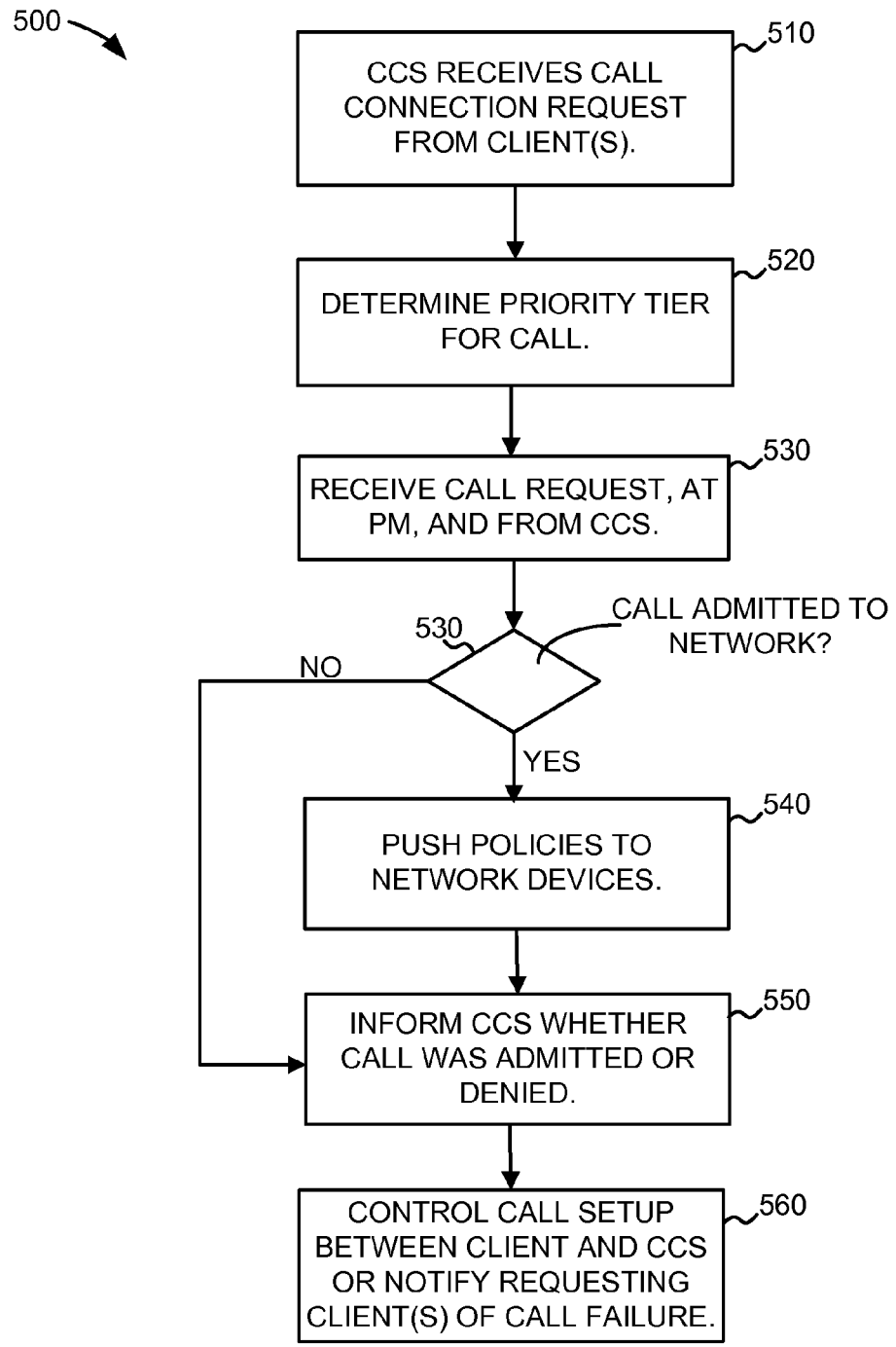
FIG. 5 is a flow chart of an example process for implementing a videoconference service.

FIG. 5 is a flow chart of an example process 500 for implementing a videoconference call in system 100. Process 500 may be performed, for example, by CCS 123 and PM 125.

Process 500 may include receiving a call connection request from one or more clients 130 (block 510). As previously mentioned, the call connection requests may be requests received at CCS 123 and based on a signaling protocol implemented between CCS 123 and clients 130, such as a SIP based protocol or the H.323 protocol. A call connection request from a client 130 may include information identifying the intended endpoint, such as an address or identifier associated with another device. For a conference call using bridge 140, the call request may identify the bridge and/or an identifier associated with the conference call (e.g., a code previously provided to a user when the user registered for the conference call).

Process 500 may further include determining the appropriate priority tier for the call (block 520). As mentioned above, in one implementation, CCS 123 may lookup, from client profile memory 415, the video conferencing priority tier associated with a client or with a call. For a point-to-point call between two clients 130, the priority tier of the call may be assigned as the highest priority tier of the two clients 130. For conference calls in which multiple clients 130 may participate in a videoconference session, the priority tier may be sent, as each leg of the call is setup, at a priority tier that is associated with the conference call.

Process 500 may further include receiving a call request at PM 125 (block 530). The call request may be transmitted, over the interface between CCS 123 and PM 125, by CCS 123 and to PM 125. The call request may identify the endpoints associated with the call, such as by IP address, and may include other parameters associated with the call, as discussed above, such as the service tier. For a conference call, each leg of the conference call, between a client 130 and bridge 140, may be associated with a separate request that may be received and processed by PM 125.

PM 125 may determine whether the call should be admitted to core network 110 (block 530). In one implementation, whether to admit or deny a call may be based on the service tier of the call and based on the network load. For example, certain service tiers, such as the highest priority and lower priority tiers, may always be admitted. Other service tiers, such as the middle priority tier, may only be admitted if edge routers 115 and core network 110 include sufficient bandwidth to ensure that QoS restrictions, associated with the middle priority tier, can be met.

When it is determined to admit the call to the network (block 530—YES), PM 125 may push policies to network devices in core network 110 to implement the call (block 540). For example, QoS policies may be delivered to each last hop edge router 115. The last hop edge routers 115 may establish the perimeter of the QoS domain. The policies may determine the granular QoS treatment for videoconferencing traffic that belongs to the call. The QoS policies may be applied to the call traffic bi-directionally at each edge router 115. For multi-party conference calls, the policies may also be applied to a network device, such as an edge router 115, that provides the connection for bridge 140.

Process 500 may further include informing CCS 123 of whether the call was admitted or denied to core network 110 (block 550). When the call is determined to not be admitted (block 530—NO), such as because sufficient bandwidth is not available or because an error was encountered when attempting to apply the call policies, PM 125 may transmit a call failure message to CCS 112. In some implementations, the message may contain an error code indicating the reason that the call was not admitted. When the call is successfully admitted to core network 110, PM 125 may transmit an indication of success to CCS 123 (e.g., an OK message may be transmitted back to CCS 123).

Process 500 may further include continuing with the call setup, between CCS 123 and the one or more clients 130, or notifying the requesting clients 130 of the failure of the call (block 560). When the call is successfully established by PM 125, CCS 123 may communicate with clients 130, such as by facilitating the establishment of the traffic stream between clients 130, using a signaling protocol such as H.323. If, however, the call is not admitted to the network, CCS 123 may transmit a message to the clients indicating failure of the call.

Figure 6:
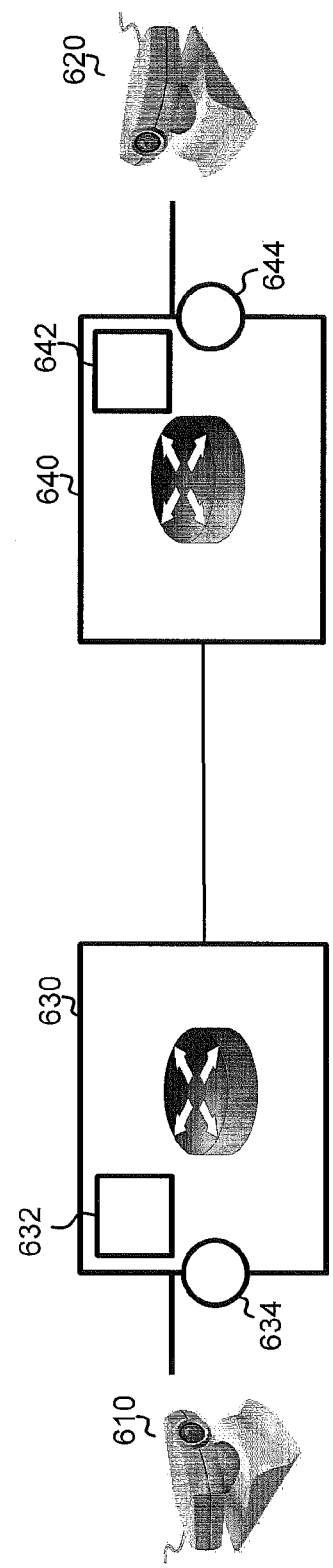
FIG. 6 is a diagram conceptually illustrating an example of a point-to-point call established between two videoconference devices.

FIG. 6 is a diagram conceptually illustrating an example of a point-to-point call established between two videoconference devices. As shown, two clients 610 and 620 may connect to two corresponding edge routers 630 and 640, respectively. Edge routers 630 and 640 may each be associated with a congestion point 632 and 642, respectively, and a policy fragment 634 and 644, respectively. Congestion points 632 and 642 may each represent a point in the network through which traffic flows for the call. Each policy fragment 634/644 may represent one or more policy rules, applied by PM 125 to the ingress or egress interfaces of the routers 630 and 640, as part of the call setup. As illustrated in FIG. 6, each client 610 and 620 may be associated with a policy fragment 634 and 644, respectively, that define the traffic policies for that client at edge routers 630 and 640. Similarly, network congestion points, such as network congestion points 632 and 642, relating to the traffic received from clients 610 and 620, may exist at each edge router to which a client is connected. The routers corresponding to possible network congestion points may be maintained by PM 125. Although two congestion points 632 and 642, associated with edge routers 630 and 640, are illustrated in FIG. 6, in general, there can be additional congestion points, corresponding to additional resources (e.g., firewalls, core routers, service processing units, etc.) that provide the call-link bandwidth, and that may be monitored and controlled by PM 125.

Figure 7:
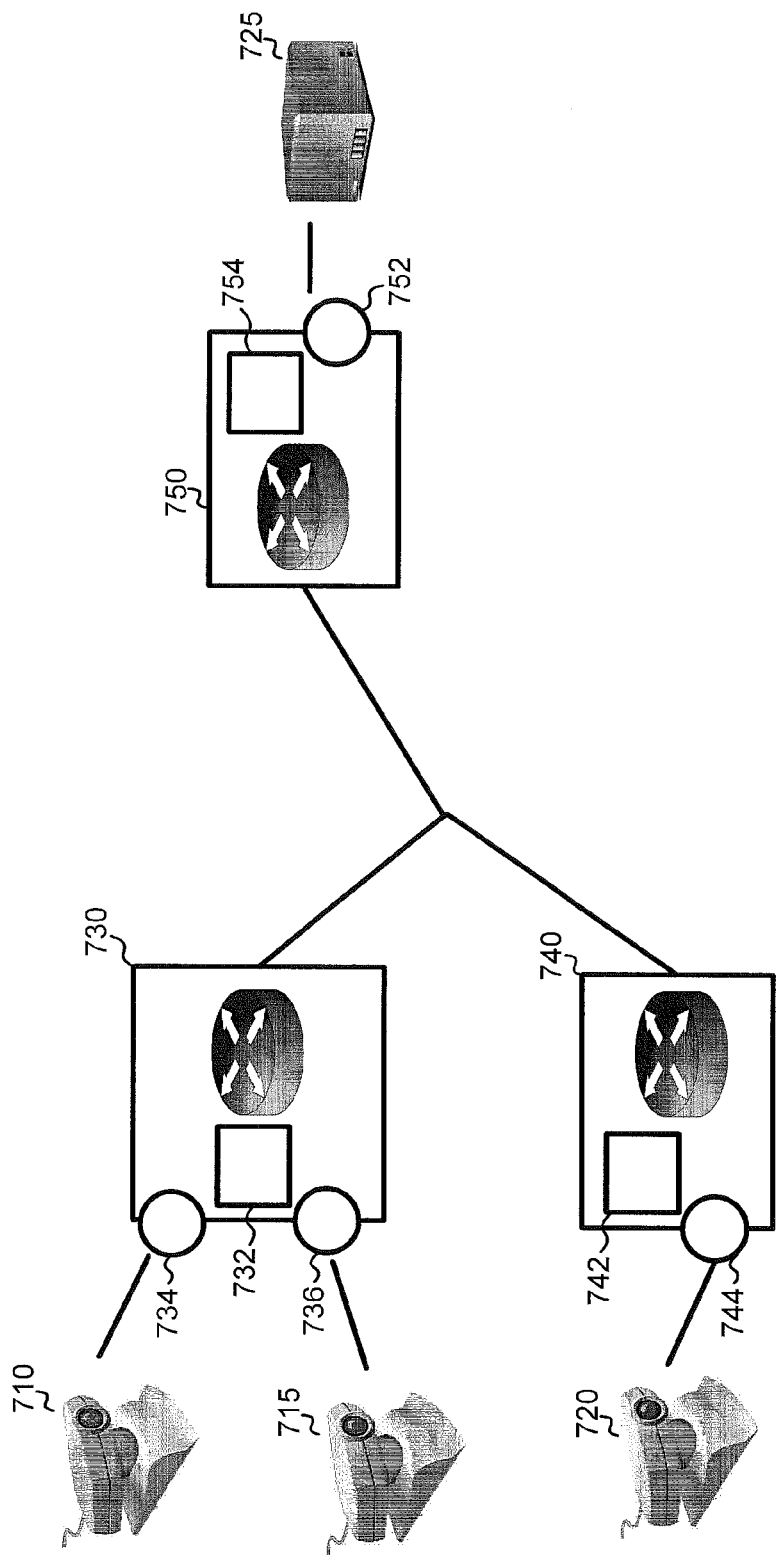
FIG. 7 is a diagram conceptually illustrating an example of a conference call established, using a bridge, between three videoconference devices.

FIG. 7 is a diagram conceptually illustrating an example of a conference call established, using a bridge, between three videoconference devices. As shown, three clients 710, 715, and 720, may connect to two edge routers 730 and 740, where clients 710 and 715 connect to edge router 730, and client 720 connects to edge router 740. A bridge 725 may connect to an edge router 750. Each of clients 710, 715, and 720 may connect to bridge 725 to implement the conference call. Edge routers 730 and 740 may be associated with congestion points 732 and 742, respectively, and edge router 750 may be associated with congestion point 754.

A policy fragment, such as one provisioned by PM 125, may be established for each client device 710, 715 and 720, and for bridge 725 (shown as policy fragments 734, 736, 744, and 752). Each policy fragment may represent one or more policy rules for the videoconference traffic associated with the particular client device, applied by PM 125, as part of the call setup. As illustrated, policy fragment 734 may correspond to client 710, policy fragment 736 may correspond to client 715, policy fragment 744 may correspond to client 720, and policy fragment 752 may correspond to bridge 725. A single edge router, such as edge router 730, may be associated with multiple policy fragments (e.g., policy fragments 734 and 736 are associated with edge router 730).

From the perspective of a network device, such as an edge router 115, policies transmitted from PM 125 to the edge router 115 may include a number of parameters, as discussed above. One or more of the parameters may relate to QoS enforcement by edge router 115. QoS enforcement relating to traffic for a particular call may be performed by assigning the traffic to a particular QoS queue. For videoconference traffic, it may be desirable that the traffic queue be implemented to not introduce undue delay during network congestion, and that all traffic that spends longer that a particular time period in the queue should be dropped.

In one implementation, videoconference traffic through the queues may be managed using a random early detection (RED) queue management technique in which the probability of dropping packets from the head of a queue is set to zero until the queue reaches a particular depth. When the queue reaches the particular depth, all traffic that exceeds the particular depth may be dropped from the head of the queue. In one implementation, the particular depth may be set to the range of 10-50 ms, where the exact depth may be determined using the formula:

$$D_q = (D_t - D_p)/(N_n * P_{cn}).$$

In this formula, $D_q$ may represent the depth of the queue in ms for particular core network 110 router; $D_t$ may represent the maximum end-to-end delay tolerated by the videoconference application with no noticeable impact to the quality (e.g., typically in the range of 150-200 ms); $D_p$ may represent the end-to-end propagation delay, which may be determined by the physical implementation of system 100; $N_n$ may represent the number of transit network nodes between the source and destination clients for the videoconference; and $P_{cn}$ may represent the probability of congestion in this particular network node, which may be a ratio defined from historical records based on the time periods when the network node was delivering videoconference services to the sum of time periods when the network node experienced congestion.

A video conferencing system was described herein in which videoconference calls may be assigned different priority tiers. A call control server and a policy manager, which may communicate using a standard or open interface, may intelligently implement the videoconferencing system, in which the call control server may handle the high-level call signaling and the policy manager may monitor and control network policies, implemented by network devices in a transmission network, to effectively and efficiently implement a video conferencing system over the transmission network.

The foregoing description of implementations provides illustration and description, but is not intended to be exhaustive or to limit the implementations to the precise form disclosed. Modifications and variations are possible in light of the above disclosure or may be acquired from practice of the disclosure.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by one or more devices, a request, from a video call control device, to initiate a videoconference call,
        the request including an indication of a service priority tier that should be applied to the videoconference call, an indication of a first device, and an indication of a second devices for the call device,
        the service priority tier being one of:
            a first tier in which videoconference calls are guaranteed a particular quality of service and are always admitted to a network,
            a second tier in which videoconference calls are admitted to the network based on bandwidth availability of the network, or
            a third tier in which videoconference calls are always admitted to network and not guaranteed a quality of service;
    determining, by the one or more devices, the bandwidth availability of the network;
    determining, by the one or more devices and based on the indication of the service priority tier for the videoconference call, whether to admit the videoconference call to the network;
    provisioning, by the one or more devices and when it is determined to admit the videoconference call to the network, traffic policies corresponding to one or more network devices of the network,
        the traffic policies being determined based on the service priority tier for the videoconference call; and
        the traffic policies relating to traffic quality of service (QoS) for the videoconference call; and
    transmitting, by the one or more devices and to the video call control device, an indication of whether the videoconference call was admitted to the network.

2. The method of claim 1, where
    when the videoconference call is a point-to-point call, the first device and the second device include client endpoint devices, and
    when the videoconference call is a multipoint conference call, the first device and the second device include endpoints of a leg of the videoconference call.

3. The method of claim 1, where
    the first tier is associated with a priority that is greater than a priority associated with the second tier, and
    the priority of the second tier is greater than a priority associated with the third tier.

4. The method of claim 1, further comprising:
    providing an interface to the video call control device as an open standard interface.

5. The method of claim 1, where the first device and the second device are specified as Internet Protocol (IP) addresses.

6. The method of claim 1, where
    the request additionally includes a timeout value, and
    the method further includes:
        terminating the videoconference call based on the timeout value.

7. The method of claim 1, further comprising:
    reversing, when the videoconference call terminates, the provisioning of the traffic policies corresponding to the one or more network devices to remove the provisioned traffic policies.

8. The method of claim 1, further comprising:
    determining the one or more devices in the network as devices that are at an edge of the network with respect to the first device and the second device.

9. The method of claim 1, where, when provisioning the traffic policies, the method includes:
    provisioning a router to queue traffic for the videoconference call using a queue that implements a random early detection (RED) queue management technique in which a probability of dropping packets from a head of the queue is set to zero until the queue reaches a particular depth, at which point packets are dropped from the head of the queue.

10. A system comprising:
    one or more devices to:
        receive a request, from a video call control device, to initiate a videoconference call in a network,
            the request including an indication of a service priority tier that should be applied to the videoconference call, an indication of a first device, and an indication of a second device,
            the service priority tier being one of:
                a first tier in which videoconference calls are guaranteed a particular quality of service and are always admitted to a network,
                a second tier in which videoconference calls are admitted to the network based on bandwidth availability of the network, or
                a third tier in which videoconference calls are always admitted to network and not guaranteed a quality of service;
        determine bandwidth availability of the network;
        determine, based on the indication of the service priority tier of the videoconference call, that the videoconference call is to be admitted to the network;
        provision, when the videoconference call is to be admitted to the network, traffic policies corresponding to one or more network devices in the network,
            the traffic policies being determined based on the service priority tier of the videoconference call; and
        transmit, to the video call control device, an indication of whether the videoconference call was admitted to the network.

11. The system of claim 10, where the traffic policies relate to quality of service (QoS) of traffic,
the traffic relating to the videoconference call, and
the traffic being processed by the one or more network devices.

12. The system of claim 10, where the one or more network devices include edge routers of the network.

13. The system of claim 10, where
the first tier is associated with a priority that is greater than a priority associated with the second tier, and
the priority of the second tier is greater than a priority associated with the third tier.

14. The system of claim 10, where the one or more devices are further to:
reverse, when the videoconference call terminates, the provisioning of the traffic policies corresponding to the one or more network devices to remove the provisioned traffic policies.

15. The system of claim 10, where the one or more devices, when provisioning the traffic policies, are further to:
provision a router to queue traffic for the videoconference call using a queue that implements a random early detection (RED) queue management technique in which a probability of dropping packets from a head of the queue is set to zero until the queue reaches a particular depth, at which point packets are dropped from the head of the queue.

16. A system comprising:
a first device to:
receive a request, from a client device, to initiate a videoconference call,
determine a service priority tier associated with the videoconference call request, the service priority tier being one of:
a first tier in which videoconference calls are guaranteed a particular quality of service and are always admitted to a network,
a second tier in which videoconference calls are admitted to the network based on bandwidth availability of the network, or
a third tier in which videoconference calls are always admitted to network and not guaranteed a quality of service, and
transmit information, including the associated service priority tier, for the videoconference call request; and
a second device to:
receive the information for the videoconference call request from the first device,
determine the bandwidth availability of the network,
determine, based on the service priority tier of the videoconference call, that the videoconference call is to be admitted to the network, and
provision, when the videoconference call is to be admitted to the network, traffic handling policies of one or more network devices in the network,
the traffic handling policies for the one or more network devices being determined based on the service priority tier of the videoconference call, and
the traffic handling policies relating to quality of service (QoS) for traffic in the videoconference call.

17. The system of claim 16, where the second device is further to:
transmit, to the first device, information, of whether the videoconference call was admitted to the network.

18. The system of claim 16, where the second device is further to:
provide an interface to communicate with the first device.

19. The system of claim 16, where
the first device is further to:
determine that the service priority tier is the first tier associated with each of a plurality of parties of the video conference call, and
the second device, when determining that the videoconference call is to be admitted to the network, is further to:
determine that the videoconference call is to be admitted to the network based on the service priority tier being the first tier.

20. The system of claim 16, where
the first device is further to:
determine that the service priority tier is associated with a priority tier associated with an initiator of the video conference call, and
the second device, when determining that the videoconference call is to be admitted to the network, is further to:
determine that the videoconference call is to be admitted to the network based on the service priority tier being associated with the priority tier associated with the initiator of the video conference call.

21. The system of claim 16, where
the first tier is associated with a priority that is greater than a priority associated with the second tier, and
the priority of the second tier is greater than a priority associated with the third tier.

22. The system of claim 16, where the second device is further to:
reverse, when the videoconference call terminates, the provisioning of the one or more network devices to remove the provisioned traffic handling policies.

* * * * *